United States Patent [19]
Carl et al.

[11] Patent Number: 5,840,804
[45] Date of Patent: Nov. 24, 1998

[54] CROSSLINKED WATER-SOLUBLE POLYMER DISPERSIONS

[75] Inventors: Joachim Carl; Peter Quis, both of Darmstadt; Manfred Braum, Mainz; Wolfram Desch, Weiterstadt, all of Germany

[73] Assignee: Roehm GmbH Chemische Fabrik, Darmstadt, Germany

[21] Appl. No.: 816,900

[22] Filed: Mar. 13, 1997

Related U.S. Application Data

[63] Continuation of Ser. No. 396,798, Mar. 1, 1995, abandoned.

[30] Foreign Application Priority Data

Mar. 1, 1994 [DE] Germany ............... 44 06 624.4

[51] Int. Cl.$^6$ ..................................................... C08L 33/08
[52] U.S. Cl. ..................... 524/555; 524/458; 524/460; 524/832; 524/833
[58] Field of Search ........................... 524/555, 458, 524/460, 832, 833

[56] References Cited

U.S. PATENT DOCUMENTS

| | | | |
|---|---|---|---|
| 4,380,600 | 4/1983 | Hosada et al. | 524/458 |
| 4,673,704 | 6/1987 | Flesher et al. | 524/519 |
| 4,835,206 | 5/1989 | Farrar et al. | 524/457 |
| 4,929,655 | 5/1990 | Takeda et al. | 524/458 |
| 5,403,883 | 4/1995 | Messner et al. | 524/458 |

FOREIGN PATENT DOCUMENTS

| | | |
|---|---|---|
| 0 271 077 | 6/1988 | European Pat. Off. . |
| 0 573 793 | 12/1993 | European Pat. Off. . |
| 0 624 617 | 11/1994 | European Pat. Off. . |
| 29 24 663 | 12/1979 | Germany . |
| WO 95/11269 | 4/1995 | WIPO . |

Primary Examiner—Marion E. McCamish
Assistant Examiner—John J. Guarriello
Attorney, Agent, or Firm—Oblon, Spivak, McClelland, Maier & Neustadt, P.C.

[57] ABSTRACT

A method of producing low-viscosity water-based water-soluble polymer dispersions having a high concentration of the principal substance is achieved by polymerizing the following monomer components, (a1) 50–99.999 wt. % of at least one water-soluble monomer;

(a2) 0.001–1 wt. % of at least one crosslinking monomer with at least two ethylenically unsaturated radically polymerizable groups;

(a3) 0–30 wt. %, particularly 1–25 wt. %, of at least one hydrophobic monomer; and (a4) 0–25 wt. %, particularly 0.1–15 wt. %, of at least one amphiphilic monomer, in aqueous solution, in the presence of at least one polymer dispersant, to form a polymer (A), where the sum of the amounts of the components represented by the monomers (a1), (a2), (a3), and (a4) is 100 wt. % of the monomers, the weight average molecular weight of the resulting polymer (A) is at least 500,000 Dalton, and polymer (A) is incompatible with the dispersant.

25 Claims, No Drawings

CROSSLINKED WATER-SOLUBLE POLYMER DISPERSIONS

This application is a Continuation of application Ser. No. 08/396,798, filed on Mar. 1, 1995, now abandoned.

BACKGROUND OF THE INVENTION

1. Field of the Invention

The invention relates to a method of producing low-viscosity water-soluble polymer dispersions containing at least one polymeric dispersant (D) and a polymer (A) containing:

(a1) at least one water-soluble monomer;

(a2) at least one crosslinking monomer with at least two radically polymerizable groups;

(a3) optionally, at least one hydrophobic monomer; and (a4) optionally, at least one amphiphilic monomer.

2. Discussion of the Background

Aqueous dispersions of water-soluble polymers are known. They are used, for example, as flocculants in waste water treatment, as de-watering agents for slurries, as retention agents in paper making, as soil conditioners, or as dispersants.

EP 170 394 describes a liquid which is water-miscible and consists of particles comprised of a high molecular weight polymer gel with particle sizes above 20 microns, in an aqueous solution. The continuous phase is an aqueous solution which contains an "equilibrating agent" which maintains the water content of the gel particles in equilibrium with the water concentration in the continuous phase, thereby preventing agglomeration of the gel particles. A preferred equilibrating agent is polyacrylic acid sodium salt or polydiallyldimethylammonium chloride (poly-DADMAC).

In EP 183 466, a method of producing a water-soluble polymer dispersion is described, characterized by polymerization of a water-soluble monomer in an aqueous solution of at least one salt in the presence of a dispersant, with stirring. Polyols, polyalkylene ethers, alkali salts of polyacrylic acid, and alkali salts of poly-2-acrylamido-2-methylpropanesulfonic acid are used as dispersants.

DE-PS 29 24 663 discloses a method of producing an aqueous dispersion of a water-soluble polymer with good stability and flowability, where the water-soluble polymer contains at least one water-soluble ethylenically unsaturated monomer, and where polyalkylene ethers, polyethyleneimine, or other polymers may be present, optionally, in the presence of inorganic salts. The dispersion thus produced, optionally, diluted with water, can be used as a flocculation aid, a thickener, a soil conditioner, or for other purposes.

In EP 262 945, a homogeneous mixture of two water-soluble polymers is claimed, in which a first polymer is produced by polymerization of the corresponding monomers in an aqueous solution of the second polymer. The concentration of the principal ingredients, namely the sum of the concentrations of the two polymers, is stated to be at least 10 wt. %, based on the weight of the aqueous solution. The ratio of the first polymer to the second polymer is in the range 10:1 to 1:20. The areas of application of such polymer solutions are the stabilization of suspended clay particles against swelling, flocculation and retention, in paper manufacture.

EP 573 793 discloses aqueous dispersions of watersoluble polymers formed by polymerization of a mixture of water-soluble hydrophobic and (optionally) amphiphilic monomers, in the presence of a polymeric dispersant. German Patent Applications P 43 16 200.2, P 43 35 567.6, and P 44 01 951.3 describe methods of producing such dispersions of water-soluble polymers.

SUMMARY OF THE INVENTION

In the production of the aqueous dispersions of water-soluble polymers by polymerization of hydrophilic monomers in an aqueous phase according to prior art methods, one avoids using crosslinking monomers as components because, at high polymer-contents, such components lead to formation of macroscopic gels with extremely high viscosities. However, when such crosslinking monomers are used in relatively moderate proportions, they may be useful for generating water-soluble polymers of high molecular weight which enable, for example, high flocculation efficiency or a high degree of thickening. In addition to the problem of preparing aqueous dispersions of water-soluble polymers which contain a certain proportion of crosslinking units, there is also the problem of achieving and maintaining a high content of polymeric principal ingredient in the aqueous dispersion along with low viscosity. A further problem is to devise a means of preparing such aqueous dispersions of water-soluble polymers in the absence of an oil phase and in the absence of salts, e.g. as described in EP 183 466, in the aqueous phase, in order to minimize the amount of substances deemed ecologically hazardous in the dispersions.

These problems have been overcome by the aqueous dispersions and methods of preparing the same of the present invention.

DETAILED DESCRIPTION OF THE PREFERRED EMBODIMENTS

It has now been discovered, surprisingly, that these problems can be solved very well by aqueous dispersions of water-soluble polymers (A) formed by the polymerization of the following monomer components:

(a1) 50–99.999 wt. %, particularly 50–98.999 wt. %, more particularly 50–98.899 wt. %, of at least one water-soluble monomer;

(a2) 0.001–1 wt. %, preferably 0.01–0.5 wt. %, of a crosslinking monomer with at least two ethylenically unsaturated radically polymerizable groups;

(a3) 0–30 wt. %, preferably 1–20 wt. %, of at least one hydrophobic monomer; and (a4) 0–20 wt. %, preferably 0.1–15 wt. %, of at least one amphiphilic monomer, in an aqueous phase, in the presence of a polymeric dispersant (D).

In preferred embodiments of the invention, at least one of the water-soluble monomers (a1) has at least one ionic group; the crosslinking monomer (a2) is selected from the group consisting of di(meth)acrylic compounds, tri(meth)acrylic compounds, the tetra(meth)acrylic compounds, and (meth)allyl (meth)acrylic compounds; the hydrophobic monomer (a3) is a compound of formula I

where $R_1$ is hydrogen or an alkyl group with 1–5 carbon atoms;

$R_2$ is an alkyl, cycloalkyl, aryl, or aralkyl group with 1–20 carbon atoms, or $R_2$ is

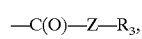

where $R_3$ is an alkyl, cycloalkyl, aryl, or aralkyl group with 1–20 carbon atoms, and the aryl group preferably has 6–12 carbon atoms, Z is O, NH, or $NR_3$; and the amphiphilic monomer (a4) is a compound of formula II $$CH_2=\underset{\underset{O}{\|}}{\overset{\overset{R_5}{|}}{C}}-C-A_1-R_6-\overset{\overset{R_7}{|}}{\underset{\underset{R_8}{|}}{N^\oplus}}-R_9-\overset{\overset{O}{\|}}{C}-O-R_{10} \quad X^\ominus, \quad (II)$$

where $A_1$ is O, NH, or $NR_4$;

$R_4$ is an alkyl group with 1–4 carbon atoms;

$R_5$ is hydrogen or methyl;

$R_6$ is an alkylene group with 1–18 carbon atoms;

$R_7$ and $R_8$, independently, are an alkyl group with 1–6 carbon atoms;

$R_9$ is an alkylene group with 1–6 carbon atoms;

$R_{10}$ is an alkyl, aryl, or aralkyl group with 8–32 carbon atoms; and

X is a halogen, OCN, SCN, $SO_4CH_3$, or acetate; or (a4) is a compound of formula III:

$$CH_2=\underset{\underset{O}{\|}}{\overset{\overset{R_{11}}{|}}{C}}-C-A_2-(Y-O)_n-R_{12}, \quad (III)$$

where $A_2$ is O, NH, or $NR_{13}$;

$R_{13}$ is an alkyl group with 1–4 carbon atoms;

$R_{11}$ is hydrogen or methyl;

$R_{12}$ is an alkyl, aryl, or aralkyl group with 8–32 carbon atoms;

Y is an alkylene group with 2–6 carbon atoms; and n is an integer in the range from 1 to 50.

In another preferred embodiment of the invention, in a first stage, the polymer (A) is produced as described in the presence of at least one polymeric dispersant (D), and in a second stage additional dispersant (D) in aqueous solution is added to the resulting polymer dispersion (PD) (see also German Patent Application P 43 16 200.2). A polymer dispersion (PD') results. Further, according to German Patent Application 43 35 567.6, the production of the polymer dispersion (PD) or (PD') is followed by a first stage, in which the water content is reduced to give a concentrated polymer dispersion, and a second stage in which additional dispersant (D) in aqueous solution is added. A polymer dispersion (PD") results.

The monomers (a1):

The monomers (a1) employed may be, for example, salts of (meth)acrylic acid of formula IV $$CH_2=\underset{\underset{O}{\|}}{\overset{\overset{R'}{|}}{C}}-C-O-Q^\oplus, \quad (IV)$$

where

R' is hydrogen or methyl; and $Q^\oplus$ is an alkali metal ion, for example, $Na^+$ or $K^+$, ammonium ions, e.g. $NH_4^+$, $^+NR''H_3$, $^+NR''_2H_2$, $^+NR''_3H$ or $^+NR''_4$, where R" is an alkyl group with 1–6 carbon atoms;

or $Q^\oplus$ is another monovalent positively charged ion.

Monomers (a1) of formula IV include sodium (meth)acrylate, potassium (meth)acrylate, and ammonium (meth)acrylate. Also usable as monomer components (a1) are acrylic acid and/or methacrylic acid, or (meth)acrylamides of formula V:

$$CH_2=\underset{}{\overset{\overset{R^{III}}{|}}{C}}-\overset{\overset{O}{\|}}{C}-N\overset{\diagup R^{IV}}{\diagdown R^V} \quad (V)$$

where $R^{III}$ is hydrogen or methyl; and $R^{IV}$ and $R^V$, independently, are hydrogen or an (optionally) functionalized alkyl group with 1–5 carbon atoms.

Examples of monomers (a1) of formula V which might be mentioned are: (meth)acrylamide, N-methyl(meth)acrylamide, N,N-dimethyl(meth)acrylamide, N-methyl-N-ethyl(meth)acrylamide, and N-(2-hydroxy)ethyl (meth)acrylamide.

For methods of producing various (meth)acrylamides, see, for example, Kirk-Othmer, 1981, "Encyclopedia of Chemical Technology", 3rd Ed., Vol. 15, pub. Wiley Interscience, New York, pp. 346–376.

In addition, monomer components (a1) may be in the form of monomers of formula VI:

$$CH_2=\underset{}{\overset{\overset{R^{IV}}{|}}{C}}-\overset{\overset{O}{\|}}{C}-Z_1-L \quad (VI)$$

where $R^{IV}$ is hydrogen or methyl;

$Z_1$ is O, NH, or $NR_4$, where $R_4$ is as defined above; and

L is the group $$-L_1-N\overset{\diagup L_2}{\diagdown L_3} \quad \text{or} \quad -L_4-\overset{\oplus}{N}\overset{\diagup L_5}{\diagdown L_7}-L_6 \quad Z^\ominus$$

where $L_1$ and $L_4$ are an alkylene group or a hydroxyalkylene group with 2–6 carbon atoms;

$L_2$, $L_3$, $L_5$, $L_6$, and $L_7$, independently, are hydrogen or an alkyl group with 1–6 carbon atoms; and Z is a halogen, acetate, or $SO_4CH_3$.

Examples of monomers (a1) of formula VI which might be mentioned are: 2-(N,N-dimethylamino)ethyl (meth)acrylate, 3-(N,N-dimethylamino)propyl (meth)acrylate, 4-(N,N-dimethylamino)butyl (meth)acrylate, 2-(N,N-diethylamino)ethyl (meth)acrylate, 2-hydroxy-3-(N,N-dimethylamino)propyl (meth)acrylate, 2-(N,N,N-trimethylammonium)ethyl (meth)acrylate chloride, 3-(N,N,N-trimethylammonium)propyl (meth)acrylate chloride, 2-hydroxy-3-(N,N,N-trimethylammonium)propyl (meth) acrylate chloride, and the (meth)acrylamide versions of the preceding compounds, e.g. 2-dimethylaminoethyl (meth)acrylamide, 3-dimethylaminopropyl (meth)acrylamide, or 3-trimethylammoniumpropyl (meth)acrylamide chloride.

For methods of producing the (meth)acrylic ammonium salts, see, e.g., Kirk-Othmer, noted above. As monomer components (a1) one may also use other ethylenically unsaturated monomers suitable for forming water-soluble polymers, e.g. vinylpyridine, N-vinylpyrrolidone, styrenesulfonic acid, or N-vinylimidazole.

In addition, one may use mixtures of the water-soluble monomers described above for (a1).

The crosslinking monomers (a2):

The compounds used as crosslinking monomers have at least two polymerizable groups. Examples of compounds with two radically polymerizable ethylenically unsaturated groups are:

(1) Alkenyl di(meth)acrylates, such as 1,6-hexanediol di(meth)acrylate, 1,10-decanediol di(meth)acrylate, 1,12-dodecanediol di(meth)acrylate, 1,18-octadecanediol di(meth)acrylate, neopentyl glycol di(meth)acrylate, methylene di(meth)acrylate, 2,2'-bis(hydroxymethyl)-1,3-propanediol di(meth)acrylate, and preferably, ethylene glycol di(meth)acrylate, 1,3-propanediol di(meth)acrylate, 1,3-butanediol di(meth)acrylate, and 1,4-butanediol di(meth)acrylate;

(2) Alkylene di(meth)acrylamides, e.g. N-methylene di(meth)acrylamide, N,N'-3-methylbutylidene bis(meth)acrylamide, N,N'-(1,2-dihydroxyethylene) bis(meth)acrylamide, and preferably N,N'-hexamethylene bis(meth)acrylamide, and particularly preferably N,N'-methylene bis(meth)acrylamide;

(3) Polyalkoxydi(meth)acrylates of formula VII:

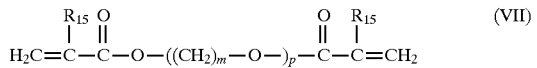

where $R_{15}$ is hydrogen or methyl;

m is an integer in the range 2–6; and p is an integer in the range 2–50.

Examples include polypropylene glycol di(meth)acrylates (m=3), with p in the range 4–25; polybutylene glycol di(meth)acrylates (m=4), with p in the range 5–40; and, preferably, polyethylene glycol di(meth)acrylates (m=2), with p in the range 2–45, e.g. diethylene glycol di(meth)acrylate, triethylene glycol di(meth)acrylate, tetraethylene glycol di(meth)acrylate; and, more preferably, polyethylene glycol di(meth)acrylates with p in the range 5–20;

(4) Examples of additional di(meth)acrylates which may be used include benzylidene di(meth)acrylate, bisphenol-A di(meth)acrylate, 1,3-di(meth)acryloyloxy-2-propanol, hydroquinone di(meth)acrylate, ethanedithiol di(meth)acrylate, propanedithiol di(meth)acrylate, polyethylene dithiol di(meth)acrylate, and polypropylene dithiol di(meth)acrylate;

(5) Divinyl compounds, for example, 1,4-butanediol divinyl ether, divinylbenzene, butadiene, 1,6-hexadiene; di(meth)allyl compounds, such as, for example, di(meth)allyl phthalate or di(meth)allyl succinate; vinyl (meth)acrylic compounds, for example, vinyl (meth)acrylate; or preferably (meth)allyl (meth)acrylic compounds, for example, allyl (meth)acrylate.

Examples of compounds having 3 or more ethylenically unsaturated radically polymerizable groups which may be used include glycerin tri(meth)acrylate, 2,2-dihydroxymethyl-1-butanol tri(meth)acrylate, trimethylolpropane triethoxy tri(meth)acrylate, trimethacrylamide, (meth)allylidene di(meth)acrylate, 3-allyloxy-1,2-propanediol di(meth)acrylate, triallyl cyanurate or triallyl isocyanurate; and also (as representative compounds with more than 3 ethylenically unsaturated radically polymerizable groups) pentaerythritol tetra(meth)acrylate and N,N,N'N'-tetra(meth)acryloyl-1,5-pentanediamine.

The hydrophobic monomers (a3):

The hydrophobic monomers are preferably monomers of formula I:

where $R_1$ is hydrogen or an alkyl group with 1–5 carbon atoms;

$R_2$ is an alkyl, cycloalkyl, aryl, or aralkyl group with 1–20 carbon atoms, or $R_2$ is —C(O)—Z—$R_3$, where Z is O, NH, or $NR_3$; and $R_3$ is an alkyl, cycloalkyl, aryl, or aralkyl group with 1–20 carbon atoms, and the aryl group preferably has 6–12 carbon atoms.

Examples of monomers of formula I include styrene, α-methylstyrene, p-methylstyrene, p-vinyltoluene, vinylcyclopentane, vinylcyclohexane, vinylcyclooctane, propene, 1-butene, isobutene, 2-methyl-1-butene, 2-methyl-1-hexene, 2-propyl-1-hexene, methyl (meth)acrylate, ethyl (meth)acrylate, propyl (meth)acrylate, isopropyl (meth) acrylate, butyl (meth)acrylate, pentyl (meth)acrylate, hexyl (meth)acrylate, octyl (meth)acrylate, decyl (meth)acrylate, dodecyl (meth)acrylate, tetradecyl (meth)acrylate, hexadecyl (meth)acrylate, octadecyl (meth)acrylate, eicosyl (meth) acrylate, cyclopentyl (meth)acrylate, cyclohexyl (meth) acrylate, cyclooctyl (meth)acrylate, phenyl (meth)acrylate, 4-methylphenyl (meth)acrylate, and 4-methoxyphenyl (meth)acrylate.

Additionally hydrophobic monomers (a3) include ethylene, vinylidene chloride, vinylidene fluoride, vinyl chloride, and other primarily araliphatic compounds with polymerizable double bonds. Mixtures of hydrophobic monomers (a3) are also possible.

The amphiphilic monomers (a4):

The amphiphilic monomers (a4) may be, for example, monomeric compounds of formula II:

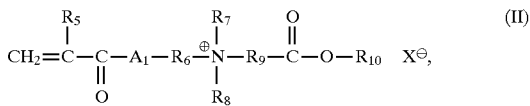

where $A_1$ is O, NH, or $NR_4$;

$R_4$ is an alkyl group with 1–4 carbon atoms;

$R_5$ is hydrogen or methyl;

$R_6$ is an alkylene group with 1–18 carbon atoms;

$R_7$ and $R_8$, independently, are an alkyl group with 1–6 carbon atoms;

$R_9$ is an alkylene group with 1–6 carbon atoms;

$R_{10}$ is an alkyl, aryl, or aralkyl group with 8–32 carbon atoms; and

X is halogen, OCN, SCN, $SO_4CH_3$, or acetate.

Further, the amphiphilic monomers (a4) may be compounds of formula IIa:

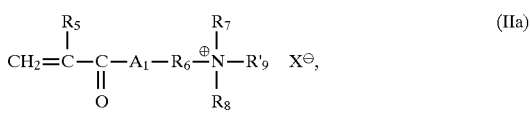

where $A_1$, $R_5$, $R_6$, $R_7$, $R_8$, and X have the same meanings as in formula II; and $R'_9$ is an alkyl group with 1–18 carbon atoms.

Examples of monomers of formulas II and IIa include

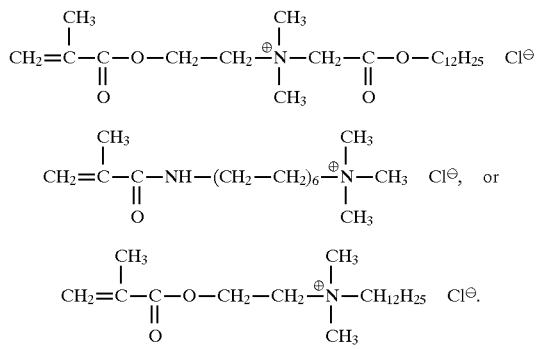

For methods of producing the amphiphilic monomers of formulas II and IIa, see, for example, Kirk-Othmer, noted above and *Id.*, 1978, Vol. 1, pp. 330–354.

Preferable amphiphilic monomers (a4) of formulas III and IIIa are

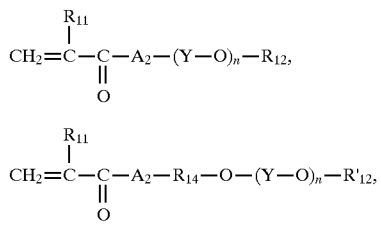

where $A_2$ is O, NH, or $NR_{13}$;

$NR_{13}$ is an alkyl group with 1–4 carbon atoms;

$R_{11}$ is hydrogen or methyl;

$R_{12}$ is an alkyl, aryl, or aralkyl group with 8–32 carbon atoms;

$R'_{12}$ is hydrogen or an alkyl group with 1–4 carbon atoms;

$R_{14}$ is an alkylene group with 1–18 carbon atoms;

Y is an alkylene group with 2–6 carbon atoms; and n is an integer in the range 1–50.

Advantageous examples of monomers of formulas III and IIIa include

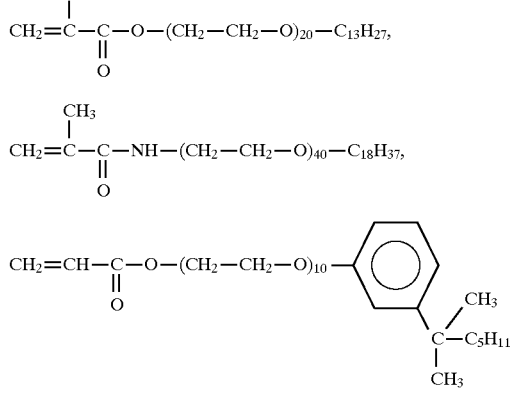

-continued

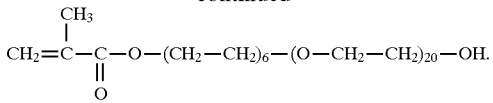

Mixtures of different amphiphilic monomers (a4) are also possible.

The polymeric dispersant (D):

The polymeric dispersant (D) is significantly different from the water-soluble polymer (A) as to chemical composition and weight average mean molecular weight Mw, and is incompatible with polymer (A). The molecular weight Mw of the polymeric dispersant (D) is in the range 1000 to 500,000 Dalton, preferably in the range 10,000–400,000 Dalton. (For the determination of Mw, see Mark, H. F., et al., 1987, "Encyclopedia of Polymer Science and Technology", Vol. 10, J. Wiley, New York, pp. 1–19.)

The term "incompatible" as used herein with regard to polymeric dispersant (D) and water-soluble polymer (A) means that dispersant (D) and polymer (A) are immiscible. When two immiscible polymers are mixed, additional interface is created and the free energy of the polymer system increases. The polymer system is thermodynamically unstable and strives toward a reduction of the total interface surface. This leads to a coarsening of the phase morphology. See Ullmann's Encyclopedia of Industrial Chemistry, 5th Ed., 1992, pp. 278–279.

The polymeric dispersant (D) also contains functional groups selected from ether, hydroxyl, carboxyl, sulfone, sulfate ester, amino, amido, imino, tert-amino, and/or quaternary ammonium groups. Examples of the polymeric dispersant (D) which might be mentioned as being advantageous are cellulose derivatives, polyethylene glycols, polypropylene glycols, copolymers of ethylene glycol and propylene glycol, polyvinyl acetates, polyvinyl alcohols, starches and starch derivatives, dextrans, polyvinylpyrrolidones, polyvinylpyridines, polyethyleneimines, polyvinylimidazoles, polyvinylsuccinimides, polyvinyl-2-methylsuccinimides, polyvinyl-1,3-oxazolid-2-ones, polyvinyl-2-methylimidazolines, and copolymers which may contain units of monomeric components of the above-mentioned polymers and may also contain, for example, maleic acid, maleic anhydride, fumaric acid, itaconic acid, itaconic anhydride, (meth)acrylic acid, salts of (meth)acrylic acid, or (meth)acrylamide monomeric units.

Preferred polymeric dispersants (D) are polyalkylene ethers, e.g. polyethylene glycol, polypropylene glycol or poly-1,4-butylene glycol. (For methods of producing polyalkylene ethers, see, e.g., Kirk-Othmer, loc.cit., 1982, Vol. 18, pp. 616–670.)

Particularly preferred polymeric dispersants (D) are polyelectrolytes, e.g. polymers which contain salts of (meth) acrylic acid as anionic monomer components; or which contain, as cationic components, methylchloride-quaternized derivatives of N,N-dimethylaminoethyl (meth) acrylate, N,N-dimethylaminopropyl (meth)acrylate, N,N-dimethylaminopropyl (meth)acrylamide or N,N-dimethylaminohydroxypropyl (meth)acrylate. (For methods of producing polyelectrolytes, see, e.g., Kirk-Othmer, loc.cit., pp. 495–530.)

Especially preferred as a polymeric dispersant (D) is polydiallyldimethylammonium chloride (poly-DADMAC) with a weight average molecular weight Mw between 50,000 and 400,000 Dalton.

Further, low molecular weight emulsifiers with molecular weight Mw<1,000 Dalton may be used, in amounts of 0–5 wt. %, in specific cases 0.1–5 wt. % (based on the total weight of the polymer dispersion).

The aqueous-polymer dispersion containing Polymer (A) and polymeric dispersant (D):

A. One-stage method of producing the dispersion (polymer dispersion PD):

The amount of the mixture of the monomers (a1), (a2), and optionally (a3) and (a4), which are used (based on 100 parts by weight (pbw) of water as the reaction medium) is in the range 5–80 pbw, preferably in the range 10–50 pbw. If the monomers (a1) and optionally (a4) are employed as aqueous solutions, the water component of those solutions adds to the reaction medium. The amount of the polymeric dispersant (D) based on 100 pbw water as the reaction medium is in the range 1–50 pbw, preferably 2–40 pbw, particularly preferably 5–30 pbw. In general, the polymeric dispersant is introduced into the aqueous reaction medium prior to the addition of the monomers (a1), (a2), and if used (a3) and (a4).

The polymerization is initiated by, for example, radical initiators or high energy radiation, e.g. UV light. Examples of preferred initiators are 2,2'-azobisisobutyronitrile, 2,2'-azobis(2-amidopropane) dihydrochloride dissolved in dimethylformamide, potassium persulfate, ammonium persulfate, and hydrogen peroxide (optionally in combination with a reducing agent such as, for example, an amine or sodium sulfite). The amount of the initiator based on the weight of the monomer mixture comprised of (a1), (a2), and optionally (a3) and (a4) is ordinarily in the range 0.00001–5 wt. %, preferably 0.0001–1 wt. %. The initiator may be added in the full amount at the beginning of the reaction, or may be added in part, with subsequent portion-wise addition over the course of the polymerization. Also, the monomer mixture itself (comprised of (a1), (a2), and possibly (a3) and (a4)) may be completely added at the start of the polymerization, or may be fed gradually over the entire course of the polymerization. The polymerization temperature is in the range 0°–100° C., preferably 30°–70° C. Preferably the polymerization is carried out under an atmosphere of inert gas, e.g. nitrogen. The conversion of the monomer mixture in the polymerization is >97 wt. %. In general, the polymerization requires 1–8 hr. The product is designated polymer dispersion (PD).

B. Two-stage method of producing the dispersion (polymer dispersion PD'):

In the two-stage production method, additional polymeric dispersant (D) is added to the dispersion (PD) of the polymer (A) which is produced according to the one-stage method. The product is designated polymer dispersion (PD').

Static and dynamic mixers may be used for the mixing process. Static mixers operate by generation of turbulence in the liquid mixture as it passes through the mixer; in dynamic mixers, the turbulence is produced actively (see, for example, Roempps Chemielexikon, 1992, 9th Ed., pub. Georg Thieme, Stuttgart and New York, p. 2805).

The preferred mixers comprise stirrers which produce a low shear gradient during stirring, including propeller stirrers, inclined plate stirrers, disk stirrers, impeller stirrers, crossbeam stirrers, grid stirrers, anchor stirrers, screw shaft stirrers, and helical stirrers (see e.g., Roempps Chemielexikon, 1993, loc.cit., pp. 3939–3940).

In the mixing process, preferably the polymer dispersion (PD) produced by the one-stage process is charged first and then the aqueous solution of the polymeric dispersant (D) is added gradually, with stirring. In this way the viscosity of the mixture is continuously under control.

In a particularly preferred embodiment of the invention, the polymer dispersion (PD) is heated to 30°–90° C., preferably 40°–70° C., in order to minimize the viscosity during the mixing process.

C. Modified two-stage method of producing the dispersion (polymer dispersion PD"):

In the modified two-stage method, in the first stage the water content of a polymer dispersion (PD) produced by the one-stage method, or a polymer dispersion (PD') produced by the above-described two-stage method is reduced, after which in the second stage, polymeric dispersant (D) in aqueous solution is added as described for the two-stage method. The product is designated polymer dispersion (PD").

The reduction of the water content of the polymer dispersion (PD) or (PD') is preferably accomplished by evaporation of water, e.g. by distillation-off (preferably at reduced pressure or in vacuum). The distillation apparatus used for this is known, e.g. distillation columns (see, Kirk-Othmer, 1979, loc.cit., Vol. 7, pp. 849–891). Other evaporation apparatus which may be used include, convection evaporators or thin-layer evaporators (see, Kirk-Othmer, 1980, loc.cit., Vol. 9, pp. 472–493). Also, methods such as membrane diffusion or binding of water with inorganic or organic reagents are possible.

The water content of the polymer dispersions (PD) and (PD') may be reduced to the extent permissible considering that the resulting polymer dispersions should be conveniently handable and stable. In general, in the first stage, polymer dispersions with a content of the water-soluble polymer of up to 50 wt. % or slightly more than 50 wt. % (based on the weight of the dispersion) are possible.

In the modified two-stage production process, the polymeric dispersant (D) is added in the second stage in the same manner as described for the regular two-stage production process. The polymer dispersion with reduced water content produced in the first stage is preferably heated to 30°–90° C., particularly preferably 40°–70° C., in order to minimize the viscosity during the mixing of the polymeric dispersant. The resulting polymer dispersion (PD") has a high content of the water-soluble polymer and a relatively low viscosity.

Advantageous effects of the invention:

The polymer dispersions (PD), (PD'), and (PD"), containing the crosslinking monomer units (a2), are distinguished by surprisingly low viscosity in relation to the concentration of the water-soluble polymer. This result is particularly surprising since the presence of crosslinking monomer component (a2) produces a molecular weight of the water-soluble polymer (A) which is much greater than that of the polymers present in prior art polymer dispersions.

When the aqueous polymer dispersions (PD), (PD'), and (PD") are thinned, the viscosity increases, to a very high maximum, and the system becomes visually clear. The thickening action of the dispersed polymer (A) is substantial.

Another advantageous feature of the inventive aqueous polymer dispersions is their high shear stability and storage stability. Thus, the high viscosity of an aqueous solution containing 1 wt. % polymer (A) remains high even after extended stirring.

The absence of organic solvents promotes safe handability (e.g., no flammability) and enables ecologically acceptable use of the inventive polymer dispersions (PD), (PD'), and (PD") as thickeners, flocculants for electrically charged suspended particles, retention agents in papermaking, and/or soil conditioners. In an isolated or low-water-content form, the inventive polymer mixture can be used as a dewatering agent, e.g. in sewage treatment and sanitation. High binding capability at high shear stress makes the inventive polymer dispersions ideal components of wallpaper coatings.

The following examples are intended to illustrate the invention. The physical parameters were determined with reference to the following standards:

Dynamic viscosity, η (mPa-sec), according to DIN 53018/53019;

Molecular weight, Mw, by gel permeation chromatography (see, Mark, H. F., et al., loc.cit.), using poly-2-trimethylammoniumethyl acrylate chloride as a standard;

Stammberg index, STB II (sec): Timewise course of kaolin sedimentation in flocculant-containing solutions in a flocculation process. 20 g kaolin per liter of tap water (20°DH=3.57×10$^{-3}$ moles of calcium ions per liter of water) is suspended and maintained homogeneous under stirring. Then 250 mL of the kaolin suspension is introduced into a 250 mL measuring cylinder and maintained homogeneous under stirring. The stirring is interrupted to add 1 mL of 0.1 wt. % aqueous solution of polymer dispersion (PD), (PD'), or (PD"), respectively. Then stirring is resumed for 15 sec, and then stopped, following which the time for the sedimentation level to fall 4 cm in the measuring cylinder is measured. This time parameter is the Stammberg index, STB II.

EXAMPLES

Example 1

275.0 g of a 40% aqueous solution of poly-DADMAC, 67.5 g acrylamide, 93.8 g of an 80% aqueous solution of 2-trimethylammoniumethyl acrylate chloride, 7.5 g butyl acrylate, 0.011 g ethylene glycol dimethacrylate (1.1 g of 1% solution in DMF), and 555.1 g water were degassed with N$_2$, and were heated to 55° C. under stirring. Then 0.015 g 2,2'-azobis(2-(2-imidazolin-2-yl)-propane) (AIP) dissolved in 0.135 g water was added. After 1.5 hr under stirring, the temperature was increased to 65° C., and an additional 0.15 g AIP dissolved in 1.35 q water was added. The after-reaction was continued an additional 2 hr at a constant temperature of 65° C.

The resulting polymer dispersion (PD1) was characterized by the following parameters:

Dynamic viscosity of the aqueous polymer dispersion, η$_1$: 39400 mPa-sec.

Dynamic viscosity of a 1% aqueous solution of the high molecular weight polymer, η$_2$: 2040 mPa-sec.

Flocculation index, STB II: 13.1 sec.

Molecular weight of polymer (A1), Mw: >10$^6$ Dalton.

Dry matter: 26 wt. %.

Example 2

275 g. of a 40% aqueous solution of poly-DADMAC, 67.5 g acrylamide, 93.8 g of an 80% aqueous solution of 2-trimethylammoniumethyl acrylate chloride, 7.5 g butyl acrylate, 0.075 g allyl methacrylate (0.75 g of a 10% aqueous solution), and 555.45 g water were degassed with N$_2$ in a reaction vessel and were heated to 55° C. under stirring. Then 0.015 AIP dissolved in 0.135 g water was added. After 1.5 hr under stirring, the temperature was increased to 65° C., and an additional 0.15 g AIP dissolved in 1.35 g water was added. The after-reaction was continued an additional 1 hr at constant temperature of 65° C.

The resulting polymer dispersion (PD2) was characterized by the following parameters:

Dynamic viscosity of the aqueous polymer dispersion, η$_1$: 29100 mpa-sec.

Dynamic viscosity of a 1% aqueous solution of the high molecular weight polymer, η$_2$: 2450 mpa-sec.

Flocculation index, STB II: 11.1 sec.

Molecular weight of polymer, Mw: >10$^6$ Dalton.

Dry matter: 26 wt. %.

Example 3

275 g. of a 40% aqueous solution of poly-DADMAC, 67.5 g acrylamide, 93.8 g of an 80% aqueous solution of 2-trimethylammoniumethyl acrylate chloride, 7.5 g butyl acrylate, 0.0075 g N,N'-methylenebisacrylamide (0.75 g of a 1% aqueous solution), and 555.45 g water were degassed with N$_2$ in a reaction vessel and were heated to 55° C. under stirring. Then 0.015 g AIP dissolved in 0.135 g water was added. After 1.5 hr under stirring, the temperature was increased to 65° C., and an additional 0.15 g AIP dissolved in 1.35 g water was added. The after-reaction was continued an additional 1 hr at constant temperature of 65° C.

The resulting polymer dispersion (PD3) was characterized by the following parameters:

Dynamic viscosity of the aqueous polymer dispersion, η$_1$: 55600 mPa-sec.

Dynamic viscosity of a 1% aqueous solution of the high molecular weight polymer, η$_2$: 2910 mpa-sec.

Flocculation index, STB II: 18.5 sec.

Molecular weight of polymer, Mw: >10$^6$ Dalton.

Dry matter: 26 wt. %.

Example 4

275 g. of a 40% aqueous solution of poly-DADMAC, 67.5 g acrylamide, 93.8 g of an 80% aqueous solution of 2-trimethylammoniumethyl acrylate chloride, 7.5 g lauryl acrylate, 0.0075 g N,N'-methylenebismethacrylamide (0.75 g of a 1% aqueous solution), and 555.45 g water were degassed with N$_2$ in a reaction vessel and were heated to 55° C. under stirring. Then 0.015 g AIP dissolved in 0.135 g water was added. After 1.5 hr under stirring, the temperature was increased to 65° C., and an additional 0.15 g AIP dissolved in 1.35 g water was added. The after-reaction was continued an additional 1 hr at constant temperature of 65° C.

The resulting polymer dispersion (PD4) was characterized by the following parameters:

Dynamic viscosity of the aqueous polymer dispersion, η$_1$: 45400 mPa-sec.

Dynamic viscosity of a 1% aqueous solution of the high molecular weight polymer, η$_2$: 2700 mPa-sec.

Flocculation index, STB II: 9.3 sec.

Molecular weight of polymer, Mw: >10$^6$ Dalton.

Dry matter: 26 wt. %.

Example 5

342.5 g of a 40% aqueous solution of poly-DADMAC, 97 g acrylamide, 125 g of an 80% aqueous solution of 2-trimethylammoniumethyl acrylate chloride, 3 g butyl acrylate, 0.1 g allyl methacrylate (1 g of a 10% aqueous solution), and 431.5 g water were degassed with N$_2$ in a reaction vessel and were heated to 55° C. under stirring. Then 0.02 g AIP dissolved in 0.18 g water was added. After 1.5 hr under stirring, the temperature was increased to 65°

C., and an additional 0.2 g AIP dissolved in 1.8 g water was added. The after-reaction was continued an additional 2 hr at constant temperature of 65° C. After termination of the reaction, the reaction mixture was thinned with 333.3 g of a 40% aqueous solution of poly-DADMAC.

The resulting polymer dispersion (PD'1) was characterized by the following parameters:

Dynamic viscosity of the aqueous polymer dispersion, $\eta_1$: 17500 mPa-sec.

Dynamic viscosity of a 1% aqueous solution of the high molecular weight polymer, $\eta_2$: 1640 mpa-sec.

Flocculation index, STB II: 11.3 sec.

Molecular weight of polymer, Mw: >$10^6$ Dalton.

Dry matter: 35.3 wt. %.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing an aqueous dispersion of a water-soluble polymer, comprising the step of:
   radically polymerizing the following monomers in aqueous solution at a temperature of 0°–100° C.;
   (a1) 50–99.999 wt. % of at least one water-soluble monomer selected from the group consisting of a salt of (meth)acrylic acid of formula IV:

(meth)acrylic acid, (meth)acrylamide of formula V:

and a monomer of formula VI:

where R' is hydrogen or methyl, $O^\ominus$ is an alkali metal ion, or ammonium ion or $O^\oplus$ is another monovalent positively charged ion;

$R^{III}$ is hydrogen or methyl, $R^{IV}$ and $R^V$, independently, are hydrogen or a $C_1$–$C_5$ alkyl group or a functionalized $C_1$–$C_5$ alkyl group;

$Z_1$ is O, NH, or $NR_4$, where $R_4$ is as an alkyl group with 1–4 carbon atoms; and L is the group

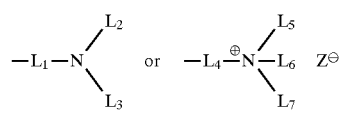

where $L_1$ and $L_4$ are an alkylene group or a hydroxyalkylene group with 2–6 carbon atoms;

$L_2$, $L_3$, $L_5$, $L_6$, and $L_7$, independently, are hydrogen or an alkyl group with 1–6 carbon atoms; and Z is a halogen, acetate, or $SO_4CH_3$ (a2) 0.01–1 wt. % of at least one crosslinking monomer containing at least 2 ethylenically unsaturated radically polymerizable groups;

(a3) 0–30 wt. % of at least one hydrophobic monomer; and (a4) 0–20 wt. % of at least one amphiphilic monomer;

in the presence of at least one polymer dispersant, to form said water-soluble polymer in a dispersion;

wherein the sum of the amounts of monomers (a1), (a2), (a3), and (a$_4$) is 100% by weight of the monomers, the weight average molecular weight of said water-soluble polymer is at least 500,000 Dalton, and said water-soluble polymer is incompatible with said polymer dispersant.

2. The method of claim 1, wherein at least one of said water-soluble monomer (a1) contains an ionic group.

3. The method of claim 1, wherein said crosslinking monomer (a2) is selected from the group consisting of di(meth)acrylates, tri(meth)acrylates, tetra(meth)acrylates, (meth)allyl (meth)acrylates and mixtures thereof.

4. The method of claim 1, wherein said polymer dispersant is a polyelectrolyte having a weight average molecular weight less than 500,000 Dalton.

5. A polymer dispersion produced by the method of claim 1.

6. The method of claim 1, wherein the amount of said crosslinking monomer is 0.01–0.5 wt. %.

7. The method of claim 1, wherein said water-soluble polymer has a weight average molecular weight>$10^6$ Daltons.

8. A method of producing an aqueous dispersion of a water-soluble polymer, comprising the step of:
   radically polymerizing the following monomers in aqueous solution at a temperature of 0°–100° C.:
   (a1) 50–98.999 wt. % of at least one water-soluble monomer selected from the group consisting of a salt of (meth)acrylic acid of formula IV:

(meth)acrylic acid, (meth)acrylamide of formula V:

and a monomer of formula VI:

where R' is hydrogen or methyl, $O^{61}$ is an alkali metal ion, or ammonium ion or $O^\oplus$ is another monovalent positively charged ion;

$R^{III}$ is hydrogen or methyl, $R^{IV}$ and $R^V$, independently, are hydrogen or a $C_1$–$C_5$ alkyl group or a functionalized $C_1$–$C_5$ alkyl group;

$Z_1$ is O, NH, or $NR_4$, where $R_4$ is as an alkyl group with 1–4 carbon atoms; and L is the group

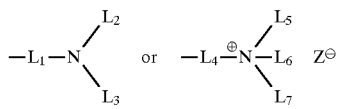

where $L_1$ and $L_4$ are an alkylene group or a hydroxyalkylene group with 2–6 carbon atoms;

$L_2$, $L_3$, $L_5$, $L_6$, and $L_7$, independently, are hydrogen or an alkyl group with 1–6 carbon atoms; and Z is a halogen, acetate, or $SO_4CH_3$;

(a2) 0.01–1 wt. % of at least one crosslinking monomer containing at least 2 ethylenically unsaturated radically polymerizable groups;

(a3) 1–25 wt. % of at least one hydrophobic monomer; and (a4) 0–20 wt. % of at least one amphiphilic monomer; in the presence of at least one polymer dispersant, to form said water-soluble polymer in a dispersion;

wherein the sum of the amounts of monomers (a1), (a2), (a3), and (a4) is 100% by weight of the monomers, the weight average molecular weight of said water-soluble polymer is at least 500,000 Dalton, and said water-soluble polymer is incompatible with said polymer dispersant.

9. The method of claim 8, wherein said hydrophobic monomer (a3) has formula I:

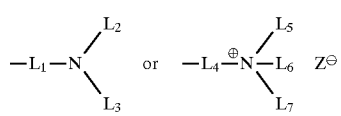

wherein $R_1$ is hydrogen or an alkyl group with 1–5 carbon atoms;

$R_2$ is an alkyl, cycloalkyl, aryl, or aralkyl group with 1–20 carbon atoms, or $R_2$ is —C(O)—Z—$R_3$, wherein $R_3$ is an alkyl, cycloalkyl, aryl, or aralkyl group with 1–20 carbon atoms, and Z is O, NH, or $NR_3$.

10. The method of claim 9 wherein monomer (a3) has formula I wherein $R_2$ is —C(O)—Z—$R_3$ where Z is O and $R_3$ is alkyl, cycloalkyl, aryl or aralkyl with 1–20 carbon atoms.

11. A polymer dispersion produced by the method of claim 8.

12. A method of producing an aqueous dispersion of a water-soluble polymer, comprising the step of:

radically polymerizing the following monomers in aqueous solution at a temperature of 0°–100° C.:

(a1) 50–98.89 wt. % of at least one water-soluble monomer selected from the group consisting of a salt of (meth)acrylic acid of formula IV:

(meth)acrylic acid, (meth)acrylamide of formula V:

and a monomer of formula VI:

where R' is hydrogen or methyl, $O^\oplus$ is an alkali metal ion, or ammonium ion or $O^\oplus$ is another monovalent positively charged ion;

$R^{III}$ is hydrogen or methyl, $R^{IV}$ and $R^V$, independently, are hydrogen or a $C_1$–$C_5$ alkyl group or a functionalized $C_1$–$C_5$ alkyl group;

$Z_1$ is O, NH, or $NR_4$, where $R_4$ is as an alkyl group with 1–4 carbon atoms; and L is the group

where $L_1$ and $L_4$ are an alkylene group or a hydroxyalkylene group with 2–6 carbon atoms;

$L_2$, $L_3$, $L_5$, $L_6$, and $L_7$, independently, are hydrogen or an alkyl group with 1–6 carbon atoms; and Z is a halogen, acetate, or $SO_4CH_3$;

(a2) 0.01–1 wt. % of at least one crosslinking monomer containing at least 2 ethylenically unsaturated radically polymerizable groups;

(a3) 0–25 wt. % of at least one hydrophobic monomer; and (a4) 0.1–15 wt. % of at least one amphiphilic monomer; in the presence of at least one polymer dispersant, to form said water-soluble polymer in a dispersion;

wherein the sum of the amounts of monomers (a1), (a2), (a3), and (a4) is 100% by weight of the monomers, the weight average molecular weight of said water-soluble polymer is at least 500,000 Dalton, and said water-soluble polymer is incompatible with said polymer dispersant.

13. The method of claim 12, wherein said amphiphilic monomer (a4) has formula II or IIa:

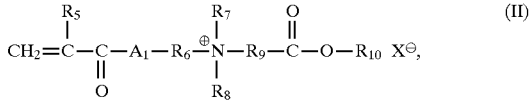

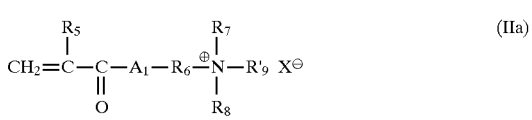

wherein $A_1$ is O, NH, or $NR_4$, $R_4$ is an alkyl group with 1–4 carbon atoms;

$R_5$ is hydrogen and methyl;

$R_6$ is an alkylene group with 1–18 carbon atoms;

$R_7$ and $R_8$, independently, are an alkyl group with 1–6 carbon atoms;

$R_9$ is an alkylene group with 1–6 carbon atoms;

$R'_9$ is an alkyl group with 1–18 carbon atoms;

$R_{10}$ is an alkyl, aryl, or aralkyl group with 8–32 carbon atoms; and

X is a halogen, OCN, SCN, $SO_4CH_3$, or acetate.

14. The method of claim 13, wherein said amphiphilic monomer (a4) has formula II.

15. The method of claim 12, wherein said amphiphilic monomer (a4) has formula III or IIIa:

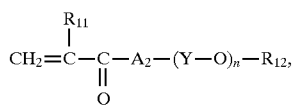  (III)

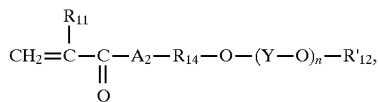  (IIIa)

wherein
$A_2$ is O, NH, or $NR_{13}$,
$R_{13}$ is an alkyl group with 1–4 carbon atoms;
$R_{11}$ is hydrogen or methyl;
$R_{12}$ is an alkyl, aryl, or aralkyl group with 8–32 carbon atoms;
$R'_{12}$ is hydrogen or an alkyl group with 1–4 carbon atoms;
$R_{14}$ is an alkylene group with 1–18 carbon atoms;
Y is an alkylene group with 2–6 carbon atoms; and
n is an integer in the range from 1 to 50.

16. The method of claim 12, further comprising polymerizing 0.1–15 wt. % of monomer (a4).

17. A polymer dispersion produced by the method of claim 12.

18. A method of producing an aqueous dispersion of a water-soluble polymer, comprising the step of:
(a) radically polymerizing the following monomers in aqueous solution:
(a1) 50–99.999 wt. % of at least one water-soluble monomer;
(a2) 0.01–1 wt. % of at least one crosslinking monomer containing at least two ethylenically unsaturated radically polymerizable groups;
(a3) 0–30 wt. % of at one hydrophobic monomer; and
(a4) 0–20 wt. % of at least one amphiphilic monomer;
in the presence of at least one polymer dispersant, to form said water-soluble polymer in a first dispersion;
wherein the sum of the amounts of monomers (a1), (a2), (a3), and (a4) is 100% by weight of the monomers, the weight average molecular weight of said water-soluble polymer is at least 500,000 Dalton, and said water-soluble polymer is incompatible with said polymer dispersant,
further comprising:
(b) adding an aqueous solution of said polymer dispersant to said first dispersion of said water-soluble polymer to form a second diluted dispersion.

19. A polymer dispersion produced by the method of claim 18.

20. The method of claim 18, further comprising:
(c) reducing the water content of said dispersion of said water-soluble polymer during step (a).

21. A polymer dispersion produced by the method of claim 20.

22. The method of claim 18, further comprising:
(c') reducing the water content of said dispersion of said water-soluble polymer after step (a) and before step (b).

23. A polymer dispersion produced by the method of claim 22.

24. A polymer dispersion produced by the method of claim 23.

25. The method of claim 18, further comprising:
(c") reducing the water content of said dispersion of said water-soluble polymer during step (a) and after step (a) but before step (b).

* * * * *